United States Patent
Ängeby et al.

(10) Patent No.: US 9,945,751 B2
(45) Date of Patent: Apr. 17, 2018

(54) ENGINE MANAGEMENT USING KNOCK DATA

(71) Applicant: SEM AB, Åmål (SE)

(72) Inventors: Jakob Olofsson Ängeby, Karlstad (SE); Sven Jörgen Peder Bengtsson, Svanskog (SE)

(73) Assignee: SEM AB, Åmål (SE)

( * ) Notice: Subject to any disclaimer, the term of this patent is extended or adjusted under 35 U.S.C. 154(b) by 0 days.

(21) Appl. No.: 15/037,686

(22) PCT Filed: Nov. 24, 2014

(86) PCT No.: PCT/EP2014/075417
§ 371 (c)(1),
(2) Date: May 19, 2016

(87) PCT Pub. No.: WO2015/075235
PCT Pub. Date: May 28, 2015

(65) Prior Publication Data
US 2016/0298553 A1 Oct. 13, 2016

Related U.S. Application Data

(60) Provisional application No. 61/908,189, filed on Nov. 25, 2013.

(51) Int. Cl.
*G01L 23/22* (2006.01)
*F02D 35/02* (2006.01)
(Continued)

(52) U.S. Cl.
CPC .......... *G01L 23/221* (2013.01); *F02D 35/027* (2013.01); *F02D 41/0002* (2013.01);
(Continued)

(58) Field of Classification Search
CPC . G01L 23/221; G01L 23/227; F02D 41/2406; F02D 41/30; F02D 41/26;
(Continued)

(56) References Cited

U.S. PATENT DOCUMENTS 6,336,355 B1 * 1/2002 Sasaki .................... F02B 77/08
73/114.39
6,945,229 B1 9/2005 Zhu et al.
(Continued)

FOREIGN PATENT DOCUMENTS

JP 2007009735 A * 1/2007 ........... F02D 35/027
JP 2009215908 A * 9/2009 ......... F02D 41/3094
(Continued)

OTHER PUBLICATIONS

U.S. Appl. No. 15/037,685, filed May 19, 2016, Ängeby, Jakob O., Measurement of Knock Intentisity.
(Continued)

Primary Examiner — Joseph Dallo
(74) Attorney, Agent, or Firm — Bresbo AB

(57) ABSTRACT

A computer-implemented platform may comprise hardware and software configured to manage an engine using knock intensity data. Knock intensities from a plurality of combustion cycles may be used to estimate a statistical distribution of knock intensities. The distribution of knock intensities may be used to determine a Descriptive Statistic, which may represent a state of tune of the engine. A calculated Descriptive Statistic may be compared to a desired Descriptive Statistic (e.g., that is representative of operation during a desired tune state of the engine). A deviation between the calculated and desired knock intensity distributions (e.g., between the calculated DS and desired DS) may be used to adjust a control parameter of the engine. Adjustment may be engine-wide. Adjustment may be cylinder-by-cylinder.

20 Claims, 8 Drawing Sheets

(51) Int. Cl.
*F02D 41/00* (2006.01)
*F02D 41/24* (2006.01)
*F02D 41/26* (2006.01)
*F02D 41/30* (2006.01)
*F02D 41/28* (2006.01)

(52) U.S. Cl.
CPC ......... *F02D 41/2406* (2013.01); *F02D 41/26* (2013.01); *F02D 41/30* (2013.01); *G01L 23/227* (2013.01); *F02D 2041/001* (2013.01); *F02D 2041/0015* (2013.01); *F02D 2041/285* (2013.01); *F02D 2041/286* (2013.01); *F02D 2041/288* (2013.01); *F02D 2400/08* (2013.01)

(58) Field of Classification Search
CPC .............. F02D 41/0002; F02D 35/027; F02D 2041/0015; F02D 2041/001; F02D 2041/286; F02D 2400/08; F02D 2041/285; F02D 2041/288
See application file for complete search history.

(56) References Cited

U.S. PATENT DOCUMENTS

| | | | |
|---|---|---|---|
| 9,593,631 B2 * | 3/2017 | Batal | F02D 35/027 |
| 2008/0276689 A1 | 11/2008 | Tanaya et al. | |
| 2009/0118989 A1 * | 5/2009 | Padhi | G01L 23/225 701/111 |
| 2010/0174472 A1 | 7/2010 | Matsushima et al. | |
| 2011/0036147 A1 * | 2/2011 | Huber | G01N 33/2817 73/35.12 |
| 2011/0146384 A1 * | 6/2011 | Kaneko | G01L 23/225 73/35.09 |
| 2016/0281617 A1 * | 9/2016 | Batal | F02D 35/027 |

FOREIGN PATENT DOCUMENTS

| | | | |
|---|---|---|---|
| KR | 20030039494 A | * | 5/2003 |
| WO | WO 2007/072207 A2 | | 6/2007 |
| WO | WO 20089/031378 A1 | | 3/2009 |

OTHER PUBLICATIONS

International Search Report and Written Opinion prepared by European Patent Office for related PCT application No. PCT/EP2014/075403.

International Search Report and Written Opinion prepared by European Patent Office for related PCT application No. PCT/EP2014/75417.

Response to ISR/WO (claims and arguments) filed with entry into National Phase in copending European Patent Application No. 14805535.3, which is the national stage of PCT/EP2014/075403.

Response to ISR/WO (claims and arguments) filed with entry into National Phase in copending European Patent Application No. 14808874.3, which is the national stage of PCT/EP2014/075417.

* cited by examiner

ENGINE MANAGEMENT USING KNOCK DATA

CROSS REFERENCE TO RELATED APPLICATIONS

The present application is the 35 USC § 371 National Stage of international patent application no. PCT/EP2014/075417, filed Nov. 24, 2014, which claims the priority benefit of U.S. Provisional Patent Application No. 61/908,189, filed Nov. 25, 2013. The present application is related to copending U.S. patent application Ser. No. 15/037,685, which is the 371(c) National Stage of international patent application no. PCT/EP2014/075403, filed Nov. 24, 2014, which also claims the priority benefit of U.S. Provisional Patent Application No. 61/908,189, filed Nov. 25, 2013.

TECHNICAL FIELD

The present invention relates generally to engine management.

DESCRIPTION OF RELATED ART

An engine may be "tuned" to affect its performance. Optimal tuning, (and by extension, engine performance) typically requires a combination of conflicting requirements. High output (e.g., high torque, power, and efficiency, low emissions and fuel consumption) is typically desired, but not to the extent that it damages or otherwise degrades the engine or environment, or that it endangers users. A desired combination of output and safety typically requires finding an optimal tuning between an "undertuned" state (low output, but safe) and an "overtuned" state (high output, but possibly damaging).

An engine operating condition may affect performance. Within an operating condition, safe operation is typically associated with controlled combustion (e.g., from a combustion front ignited by a spark plug or a fuel injection). A "high output" operating condition often increases the likelihood of uncontrolled combustion, of which knocking is an example.

An engine may be "overtuned" to an extent that results in frequent and/or intense knocking. Knocking (or pinging, pinking, detonation), is a combustion event in which an uncontrolled explosion occurs within the cylinder. Typically knocking comprises an instantaneous, explosive ignition of a pocket of fuel/air mixture outside of the controlled combustion zone (e.g., ahead of the flame front). A local shockwave is created around the pocket and the cylinder pressure may rise sharply. A low intensity or "mild" knock may not be harmful. However, if the engine is operated too "safely" (e.g., too far away from a condition where knocking becomes harmful), engine performance may decrease, fuel consumption may increase, and/or emissions may increase. A high intensity or "harsh" knock may cause damage, particularly if repeated frequently. In extreme cases, engine parts can be damaged or destroyed.

Optimal engine management typically requires the management of knocking, and more specifically, control of the engine to maintain the "right number" of knocks at an appropriate intensity. An improved knock detection and engine management system would improve operation in a desired state of tune, between an "undertuned" state of low performance and an "overtuned" state of possible damage.

SUMMARY OF THE INVENTION

Various aspects provide systems and methods for managing an engine using knock intensity data. A distribution of knock intensities in a window of operation (e.g., over a period of time) may be determined. An observed distribution of knock intensities may be compared to a desired distribution of knock intensities (e.g., from an ideally operating engine). A deviation between the observed and desired distributions may be used to adjust a control parameter of the engine (e.g., to tune the engine back into a preferred operating condition or "tune state").

A computing platform may comprise computing hardware having a computer readable, non transitory storage medium coupled to a processor and a memory, with the processor configured to communicate with a sensor and an engine control system configured to operate an engine (e.g., to maintain the engine in a desired tune state). The sensor may be configured to sense knocking within one or more cylinders of the engine during a combustion cycle. The storage medium may have embodied thereon instructions executable by the processor to perform a method stored in the memory, the method comprising: identifying a window of at least three, five, ten, twenty, fifty, 100, 1000, 10,000 combustion cycles, measuring a knock intensity for each of at least a plurality of combustion cycles within the window, calculating a descriptive statistic (DS) describing a statistical distribution of the measured knock intensities, comparing the calculated DS to a desired DS (e.g., representing a desired distribution of knock intensities), and adjusting a control parameter of the engine when the calculated DS deviates from the desired DS (e.g., by an amount greater than a threshold). The threshold may be large enough to account for noise or other errors, and small enough to induce "retuning" of the tune state before performance is significantly impaired.

Engine adjustment may be performed periodically. In some cases (e.g., with PID (Proportional, Integral, Derivative) control) adjustment may be substantially continuous. Certain embodiments comprise a computing platform. Some embodiments comprising a computing platform and one or more sensors. Some embodiments comprise a computing platform (and optionally one or more sensors) coupled to an engine (e.g., having one, two, three, four, six, eight, twelve, or even sixteen cylinders).

An engine may comprise one or several cylinders, and knock intensity data may comprise measurements from one and/or several cylinders. A control parameter may comprise at least one of ignition timing, fuel injection timing, fuel injection volume, number of fuel injections (in a given combustion cycle), a volume of fuel delivered to a cylinder, valve timing, and a position of a valve during a combustion cycle (which may control compression ratio).

In some embodiments, an engine comprises at least first and second cylinders (which may have their own sensors, or may be sensed by the same sensor). The method may comprise calculating a first DS for the first cylinder and a second DS for the second cylinder. The first DS may be compared to a desired first DS (for the first cylinder) and the second DS may be compared to a desired second DS (for the second cylinder). An aggregate DS may be calculated that comprises the deviation of each actual DS from its respective desired DS. The control parameter may be adjusted in response to a deviation from the aggregate DS from a desired aggregate DS. In some cases, the first DS is calculated over a first window of combustion cycles, and the second DS is calculated over a second window of combustion cycles. In some embodiments, a first window of combustion cycles is used for a first cylinder, and a second window of combustion cycles is used for the second cylinder. The first and second windows may overlap (or even be over identical periods of time). The first and second windows may be discrete (e.g., over separate periods of time). The first and second windows may overlap. The first window may have the same or a different number of combustion cycles as the second window.

A deviation between observed and desired DS may trigger an adjustment of tune state (e.g., via the adjustment of one or more control parameters). A magnitude of the adjustment of a control parameter may depend upon the magnitude of the deviation between the observed and desired DS. In some cases, a deviation between observed and desired DS may trigger an alarm signal (e.g., notification data). An alarm may be triggered when a value of a control parameter exceeds a threshold value. An alarm may notify a user and/or initiate a safety process (e.g., shutdown, dethrottling, declutching).

Calculating the DS may comprise determining a difference between an observed distribution of knock intensities and an expected distribution of knock intensities. The expected distribution may be over the same number of combustion cycles (as the window of observed knock intensities). The expected distribution may be over a larger window (e.g., an "ideal" or "perfect" distribution of knock intensities) and/or smaller window of combustion cycles.

In an embodiment, each cylinder in an engine comprising multiple cylinders is managed using cylinder-specific knock intensity data (e.g., observed and desired). In an implementation, each cylinder has its own sensor (e.g., an ion sensor) and its own desired distribution of knock intensities (e.g., based on its historical responses and/or benchmarked data), and over a window of combustion cycles (involving all the cylinders), the comparison of desired to observed DS is calculated for each cylinder. The control parameter(s) for each cylinder may be adjusted in response to the specific deviation in knock intensity distribution (from desired) for that cylinder.

Knock intensity distributions may be represented as histograms of groups ("bins") of combustion events, with events in a bin having similar knock intensities (i.e., within upper and lower limits of that bin's representative knock intensity). A histogram (of bins) may represent the distribution of observed knock intensities in the window of operation. A bin may comprise a range of observed knock intensities that are grouped together into a "bin" having a representative or "canonical" knock intensity (e.g., the mean knock intensity for members of the bin). A bin may have a representative knock intensity that is midway between the intensities of the upper and lower limits of the bin (or an intensity of either limit). A histogram may comprise at least two bins, including at least three, four, five, seven, or nine bins. A histogram may have fewer than 1000 bins, including fewer than 100 bins, including fewer than 10 bins. A preferred distribution has between 3 and 15 bins, including between 5 and 10 bins.

A window of knock intensity data (e.g., as represented by a histogram) may be used to calculate a DS for that window. Calculating a DS (e.g., based on observed knock intensities during a window of operation) may comprise determining a number of knocks in a bin that is at or near the mean knock intensity bin (e.g., the bin that includes the mean knock intensity of the distribution). Calculating the DS may comprise determining a number of knocks in a bin at which the maximum number of knocks occurs. The DS may comprise a range or subset of knock intensities (e.g., at high intensity and/or low intensity). Exemplary subsets include the number of knocks in the lowest 5% of knock intensity bins, the number of knocks in bins between 5% and 20% of the lowest knock intensity, the number of knocks in the highest 40% of the knock intensity bins, the highest 60%, or even the highest 80% of bins. A DS may comprise a number of knocks in a subset of bins. A DS may exclude knock intensity bins that have similar numbers of knocks independent of tune state (e.g., a commonly observed subset of knock intensities). A DS may comprise a weighting function (e.g., weighting different bins or subsets of bins according to the values of knock intensity of those bins). A DS may comprise a function of several other DS (e.g., a sum of the DS computed for several different subsets of knock intensities). A DS may comprise determining a number of knock intensity bins in which at least one knock occurred. A DS may comprise a statistical representation of a knock intensity distribution, such as a mean knock intensity of the window, a standard deviation of knock intensities in the window, and a skew of knock intensities in the window.

The DS may comprise determining a number of knocks at a knock intensity bin that is at least 20%, preferably at least 100%, preferably at least 200% larger than at least one of the knock intensity bin associated with the mean knock intensity and the knock intensity bin having the maximum number of knocks. Such a DS may represent the deviation or spread of the distribution.

Calculating the DS may comprise applying a "forgetting factor" to the window of operation. The forgetting factor may weight the knock intensity distribution in a manner that assigns greater weight to more recent knocking events and less weight to knocking events in the more distant past.

The present description incorporates by reference U.S. provisional patent application No. 61/908,189, filed Nov. 25, 2013. The present description claims the priority benefit of and incorporates by reference related application PCT patent application no. PCT/EP2014/075403, filed Nov. 24, 2014, titled "Measurement of Knock Intensity," which also claims priority to U.S. provisional patent application No. 61/908, 189. Systems and methods described herein may be used in combination with those disclosed in the aforementioned applications, and vice versa, mutatis mutandis.

DETAILED DESCRIPTION

Systems and methods provide for engine management using knock intensity data. Knock intensity may be estimated using traditional sensors and/or methods (e.g., a single measurement compared to a threshold). Knock intensity may be estimated using systems and/or methods disclosed in the aforementioned PCT patent application no. PCT/EP2014/075403, filed Nov. 24, 2014 (e.g., by using a plurality of knock indicators to determine knock intensity). Knock intensity may be estimated using traditional methods.

A statistical distribution of knock intensities from prior combustion cycles may be used to calculate a Descriptive Statistic (DS). The DS may represent and/or be used to estimate a state of tuning of the engine. A difference between a calculated DS (based on current observations) and a desired DS (associated with a desired tuning) may be used to adjust the tuning of the engine. Tuning may be adjusted via one or more control parameters associated with engine operation (e.g., timing, fueling, compression). The DS may be continually monitored (and adjusted if needed) by calculating the DS over a moving window of historical combustion cycles. The window may incorporate a "forgetting factor" that weights more recent combustion events more heavily than combustion events in the distant past.

Various embodiments comprise computer-implemented methods, which may be performed on a platform comprising computing hardware and software instructions for that hardware. Some methods may be implemented using new hardware. Some implementations may use existing hardware, whose customization with new software creates a new machine. Various methods described herein may be implemented by platforms described herein.

Figure 1:
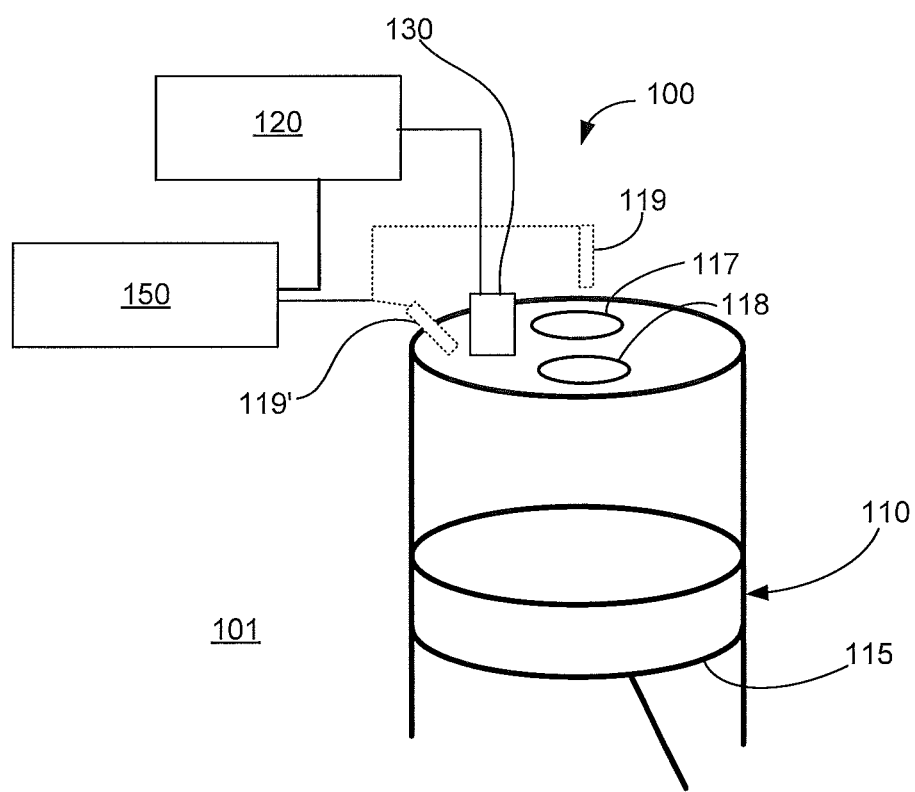
FIG. 1 is a schematic illustration of an engine, according to some embodiments.

FIG. 1 is a schematic illustration of an engine, according to some embodiments. A system 100 comprises an engine 101 having one or more cylinders 110, each having a respective piston 115. An intake valve 117 provides air (optionally mixed with fuel) to cylinder 110. An exhaust valve 118 allows combustion products to exit cylinder 110. A valve may be actuated electromagnetically and/or electromechanically. A valve may be actuated by a camshaft (not shown), rocker arm (not shown), and/or other actuator (e.g., piezoelectric, solenoid, not shown) to adjust valve timing with respect to top dead center (TDC) of piston 115 in cylinder 110. A valve may be actuated to adjust valve position (e.g., an amount of opening of the valve). Valve actuation may be used to adjust compression.

Fuel may be injected indirectly (e.g., using a port fuel injector 119 in fluid communication with an intake port or throttle body (not shown)), and may be mixed with incoming air and delivered to the engine via intake valve 117. In some embodiments, a direct injector 119' may inject (e.g., spray) liquid fuel (e.g., diesel fuel, gasoline, compressed natural gas, liquid propane) directly into cylinder 110. Some embodiments comprise both an indirect injector 119 and a direct injector 119'. An injector may inject one or more fuel injections (e.g., at various times with respect to crank angle).

One or more sensors 130 may provide data used to calculate knock intensity within the cylinder. A knock intensity r(k) may represent a severity of (e.g., an energy released during) a knocking event during a particular combustion cycle (k). Sensor 130 may monitor conditions within the cylinder (e.g., using ion current, by measuring pressure within the cylinder, and the like). Sensor 130 may comprise an ion current sensor, which may be integrated with a spark plug. Sensor 130 may be external to the cylinder (e.g., an acoustic sensor on the engine block). Some embodiments have a sensor associated with a single cylinder (e.g., of a multicylinder engine) and/or another part of the engine 101 (e.g., the engine block, not shown). Some multicylinder engines have a sensor on each cylinder. Sensor 130 may include a plurality of sensors (e.g., in different locations), including an in-cylinder sensor and an ex-cylinder sensor, and/or several in-cylinder and/or several ex-cylinder sensors. Sensors may be located at different distances from the center of a cylinder. Sensors may be located at different locations with respect to an intake valve 117 and/or an exhaust valve 118. Sensors may be located in the cylinder head and/or the engine block. Some embodiments utilize several knock indicators from a single sensor (e.g., different frequency bands of a fourier-transformed, bandpass-filtered signal associated with in-cylinder pressure vs. time (e.g., with respect to TDC)). Some embodiments utilize knock indicators received from several different sensors.

In an exemplary embodiment, sensor 130 includes an ion sensor, which may include a spark plug, which may be integrated with an ignition system for the engine (not shown) coupled to the engine control system. The spark plug may sense ion current over time, which may correlate with pressure in the cylinder. The sensed ion current may be transformed into the frequency domain, and one or more frequency bands (e.g., a fundamental tone, a harmonic tone, and the like) may be selected. The magnitude of the signals in the bands may be used to calculate knock intensity. In some cases, a probability distribution function (PDF) associated with each of two or more knock intensity bands is used. For a given coordinate (in knock indicator space $y(i,k)$), the probability densities of several bands (of knock intensity) may be calculated, and the band having the highest probability density (at that coordinate) may define the knock intensity of that coordinate's combustion event.

Sensor 130 is in communication with a platform 120, which may comprise computing hardware and software configured to monitor the sensor, and may also monitor engine operation (e.g., via communication with an engine control system, not shown). Platform 120 may be in communication (and/or may be integrated) with an engine control system 150, which may control engine 101 (e.g., using data from sensor 130). Engine control system 150 may comprise a computing platform (e.g., processor, memory, storage media, and stored instructions executable by the processor) configured control engine 101.

Engine control system 150 may control engine 101 via (inter alia) the adjustment of one or more control parameters. A control parameter may include ignition timing (e.g., for a spark ignited engine). A control parameter may include fuel injection timing (e.g., number of injections, timing of injections, fuel quantity) which may be injected into a port upstream of intake valve 117 (e.g., via indirect injector 119) and/or directly into cylinder 110 (e.g., via direct injector 119'). A control parameter may include a volume of fuel delivered to cylinder 110. A control parameter may include a position of one or more valves 117, 118 and/or a timing of one or more valves 117, 118. Valve position or timing (with respect to TDC) may be used to control compression within cylinder 110, swirl characteristics (of a gas flowing into or out of cylinder 110), amount of exhaust gas re-use, and the like, an.

Engine control system 150 may receive a demand for output (e.g., torque, power) and control engine 101 to respond to the demand (e.g., via a crankshaft (not shown) driven by piston 115). Pursuant to a set of control parameters under which the engine is operating during a combustion cycle, one or more operating conditions may characterize the set of operational variables (e.g., load, speed, ignition timing, injection timing, valve timing, BMEP (brake mean effective pressure), and the like) associated with meeting the demand for power. An opcondition(k) may be a set of control parameters describing the operating condition of engine 101 during combustion cycle (k), and may include load, speed, and/or environmental data.

The following table describes annotations used for certain embodiments.

TABLE 1

| Term | Definition |
| --- | --- |
| (k) | reference to a particular combustion cycle (the kth combustion cycle) |
| Control parameter i(k) | Value of a particular control parameter (i) during combustion cycle(k); may control tune state of engine |
| Opcondition(k) | set of engine operating conditions during combustion cycle (k), |
| r(k) | knock intensity for combustion cycle (k), e.g., calculated from sensor 130 |

Figure 2:
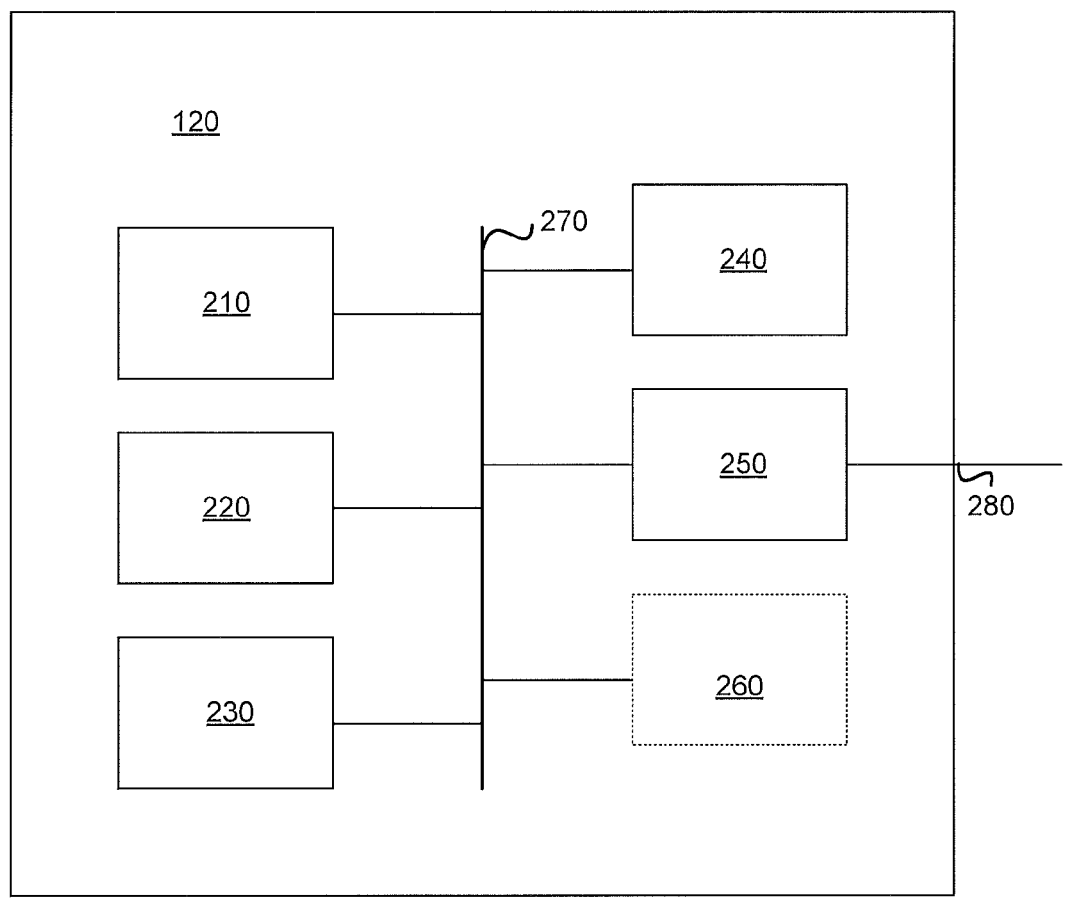
FIG. 2 is a schematic illustration of several exemplary components of a platform, according to certain embodiments.

FIG. 2 is a schematic illustration of several exemplary components of a platform, according to certain embodiments. A platform (e.g., 120) may comprise hardware (e.g., a processor, memory, storage, and the like) and software (e.g., instructions stored in the memory and executable by the processor to perform a method). Platform 120 may include and/or communicate with a server, such as a web server, an application server, a database server, and the like. Platform 120 may include or provide input for graphical and/or audio output to user devices. Platform 120 may be configured to receive input from the user devices. In some configurations, a user device communicates with platform 120 using a standard internet protocol (IP) over a network, and may use one or more IP addresses. In some cases, communications may include encrypted information.

In exemplary embodiments, platform 120 includes a variety of hardware components, including processor 210, memory 220, storage 230, input/output (I/O) interface 240, communication network interface 250, and display interface 260. These components may be generally connected via a system bus 270. Platform 120 may communicate (e.g., with engine control system 150) via communication bus 280. In some embodiments, platform 120 includes and/or is configured to control a video card and/or display device (not shown).

Processor 210 may be configured to execute instructions. In some embodiments, processor 210 comprises integrated circuits or any processor capable of processing the executable instructions. In some embodiments, processor 210 may include a cache, a multi-core processor, a video processor, and/or other processors. Processor 210 may include a programmable logic controller (PLC).

Memory 220 may be any memory configured to store data. An example of memory 220 includes a computer readable non-transitory storage medium, which may include any medium configured to store executable instructions. For example, the memory system 220 may include, but is not limited to, storage devices such as RAM, ROM, MRAM, flash memory, and/or memory.

Certain configurations include storage 230 as part of platform 120. In other configurations, storage 230 may be implemented remotely, for example as part of a remotely located database (not shown). Storage 230 may be any storage configured to receive, store, and provide data. Storage 230 may also include computer readable storage media such as flash memory, a hard drive, an optical drive, and/or magnetic tape. Storage 230 may include a database or other data structure configured to hold and organize data. In some embodiments, platform 120 includes memory 220 in the form of RAM and storage 230 in the form of a hard drive and/or flash memory.

Input and output (I/O) may be implemented via I/O interface 240, which may include hardware and/or software to interface with various remotely located devices such as a user device and/or an engine control system. I/O interface 240 may interact with a local keyboard, mouse, pointer, and the like in some embodiments.

Communication network interface 250 may communicate with various user devices, and such communications may include the use of a network, such as a LAN, WAN, and/or the internet. Communication network interface 250 may support serial, parallel, USB, firewire, Ethernet, and/or ATA communications. Communication network interface 250 may also support 802.11, 802.16, GSM, CDMA, EDGE and various other wireless communications protocols.

Display interface 260 may include any circuitry used to control and/or communicate with a display device, such as an LED display, an OLED display, a CRT, a plasma display, and the like. In some configurations, display interface 260 includes a video card and memory. In some configurations, a user device may include a video card and graphic display, and display interface 260 may communicate with the video card of the user device to display information.

The functionality of various components may include the use of executable instructions, which may be stored in computer readable storage media (e.g., memory and/or storage). In some embodiments, executable instructions may be stored in memory 220 and/or storage 230. Executable instructions may be retrieved and executed by processor 210, and may include software, firmware, and/or program code. Executable instructions may be executed by the processor to perform one or more methods.

Figure 3A:
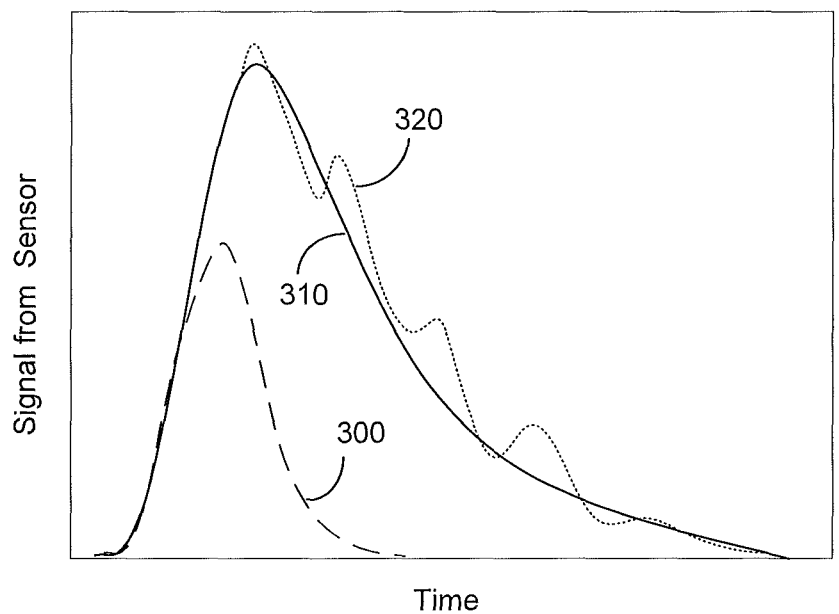
FIGS. 3A and 3B illustrate representative knock phenomena, according to some embodiments.
Figure 3B:
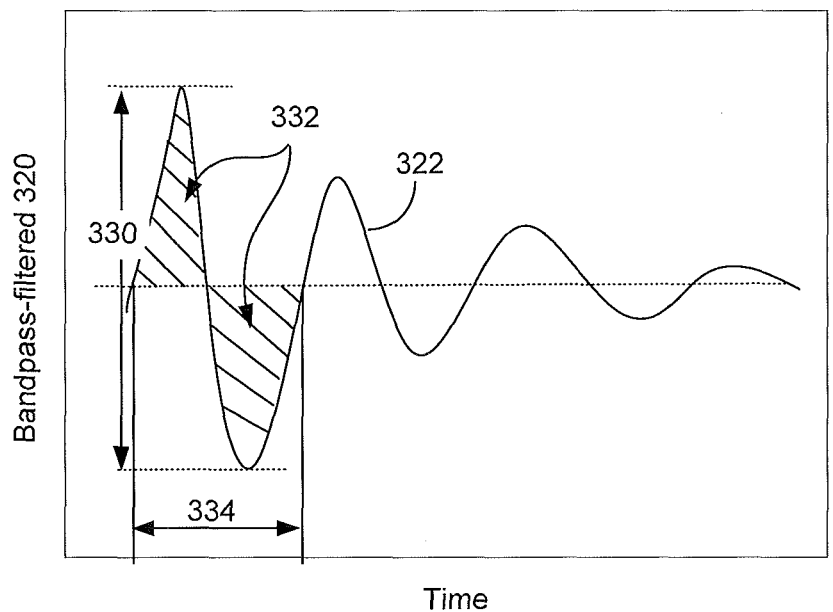

FIGS. 3A and 3B illustrate representative knock phenomena, according to some embodiments. FIG. 3A schematically illustrates data from a sensor 130 (e.g., a pressure sensor) as a function of time during (different versions of) a single combustion cycle (k). Noncombustion curve 300 describes the pressure within the cylinder without combustion (e.g., from the piston pressurizing gas in the cylinder). Combustion curve 310 illustrates pressure within the cylinder during a controlled combustion event (without substantial knocking). Knocking curve 320 illustrates a representative knocking response, and may incorporate wavelike features (e.g., associated with pressure waves within the cylinder). Knocking curve 320 may include a very low frequency component (e.g., as in combustion curve 310, monotonic) superposed with one or more high frequency components (which may be associated with resonance within the cylinder).

FIG. 3B illustrates an exemplary processing, in which knocking curve 320 has been bandpass-filtered. Filtered curve 322 may be a bandpass-filtered version of knocking curve 320. Bandpass-filtering may include removing signal components outside a desired range (or band) of sensor data (e.g., a baseline or monotonic response associated with curve 310).

Various data describing knock intensity may be extracted from filtered curve 322 to calculate knock intensity r(k). In some cases, r(k) 330 may be the maximum magnitude change of filtered curve 322 (e.g., within a given time period within a combustion cycle). In some cases, r(k) 332 may be an integrated area (e.g., over a period of time), including a plurality of integrated areas. Other methods may be used to calculate knock intensity r(k) for a given combustion cycle. Knock intensity may then be determined over a window of combustion cycles.

Figure 4:
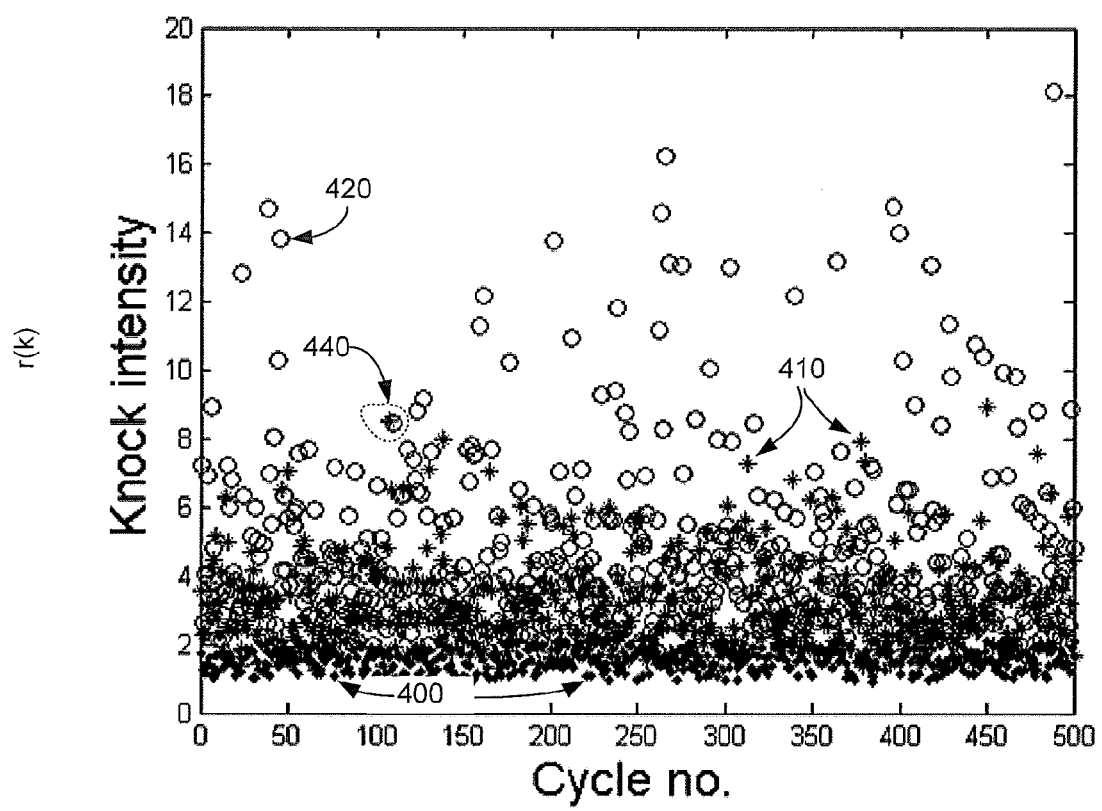
FIG. 4 illustrates a representative variation in knock intensity r(k) during operation at several different tune states, according to some embodiments.

FIG. 4 illustrates a representative variation in knock intensities r(k) during operation at several different tune states, according to some embodiments. For a window of approximately 500 simulated combustion cycles, FIG. 4 illustrates the variation in observed knock intensities for each of three different tune states (with the data from the three different states of tune superposed). Dots (diamonds) 400 are from an "undertuned" state in which the engine is operating at low performance (but low damage possibility). Stars 410 are from a "desired" tune state that optimizes the tradeoff between performance and safety. Circles 420 are from an "overtuned" state in which the engine may be damaged.

As shown by the overlap (in observed knock intensities) among the windows, a particular tune state may be associated with a wide range of knock intensities, and the range from one tune state may overlap with the range from another tune state. A desired tune state (e.g., resulting in stars 410) may have some high intensity knocks (often associated with an overtuned state) and some low intensity knocks (often associated with an undertuned state). For example, region 440 shows two observations having nearly identical knock intensities, notwithstanding that the circle (in the region) resulted from an "overtuned" tune state and the star (in the region) resulted from a "desired" tune state.

Knocking may be influenced by stochastic processes. As a result, a single knocking event may not robustly identify the particular tune state of that combustion cycle. A single observation of a harsh knock may result from an "overtuned" state, but a harsh knock might also result from a "correctly tuned" or "undertuned" state.

Whereas a single knocking event might be attributable to any number of different tune states, the distribution of knock intensities in a window of observations may be used to identify a specific tune state. A deviation between a desired distribution and an observed distribution may be used to adjust a control parameter to tune the engine to a desired state of tune. Stochastic knocking processes may be accounted for via the analysis of a plurality of prior combustion events in a window of operation.

A desired tune state may be represented by an expected distribution of knock intensities. During operation, a deviation of an observed distribution of knock intensities from the desired distribution may be used to indicate deviation from a desired state of tune. In response to this deviation, one or more engine control parameters may be adjusted to bring the engine to the desired state of tune. A knock intensity distribution during a window of operation may be used to manage the engine. In some cases, a small number of (e.g., one) data points may represent the distribution. Exemplary distributions and several associated data describing them (e.g., descriptive statistics) may be illustrated using histograms, in which data are "binned" or "grouped" such that observations having similar knock intensities are grouped together in the same bin, which is assigned a representative knock intensity. Histogram generation may reduce computation time. An embodiment need not require the generation of a histogram per se.

Figure 5A:
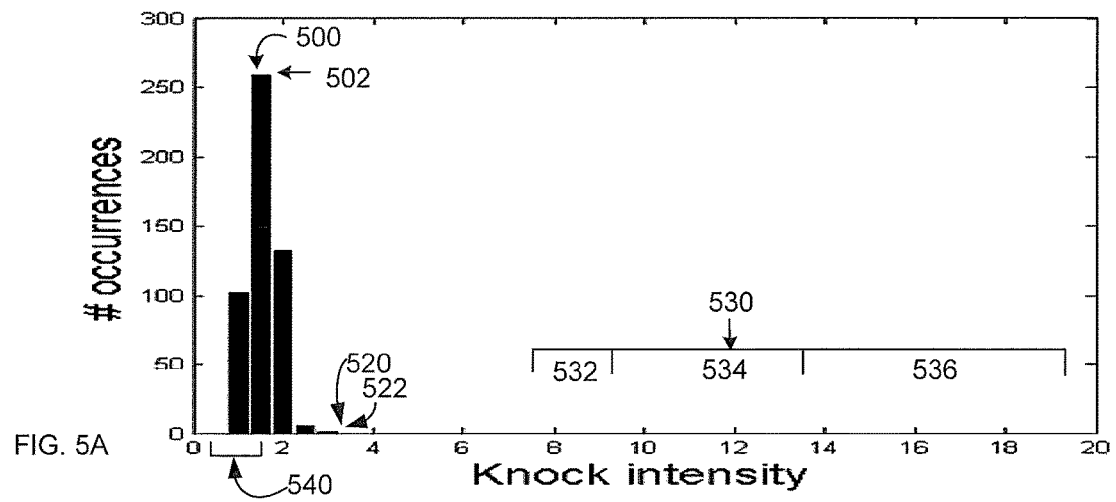
FIGS. 5A-C illustrate histograms for several states of tune, according to some embodiments.
Figure 5B:
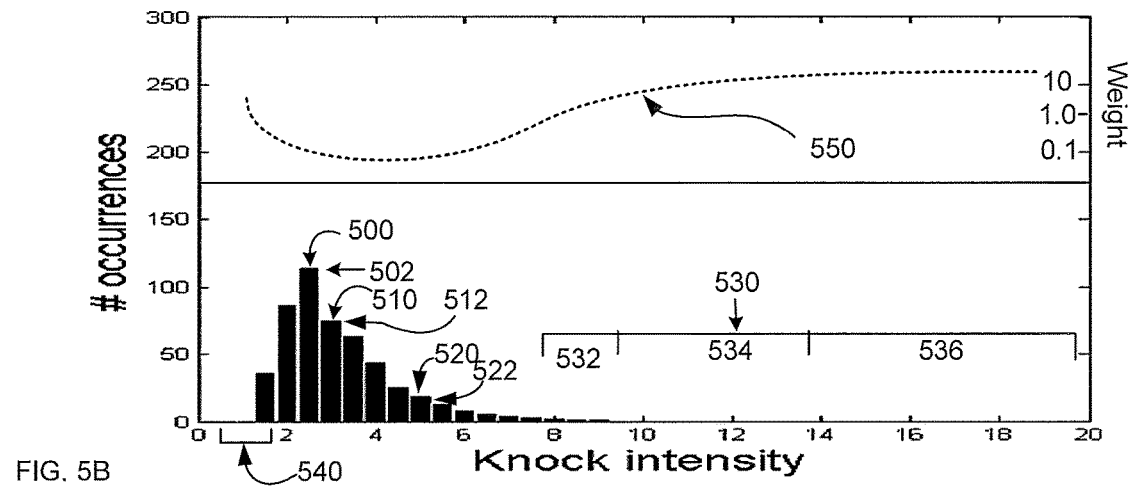
Figure 5C:
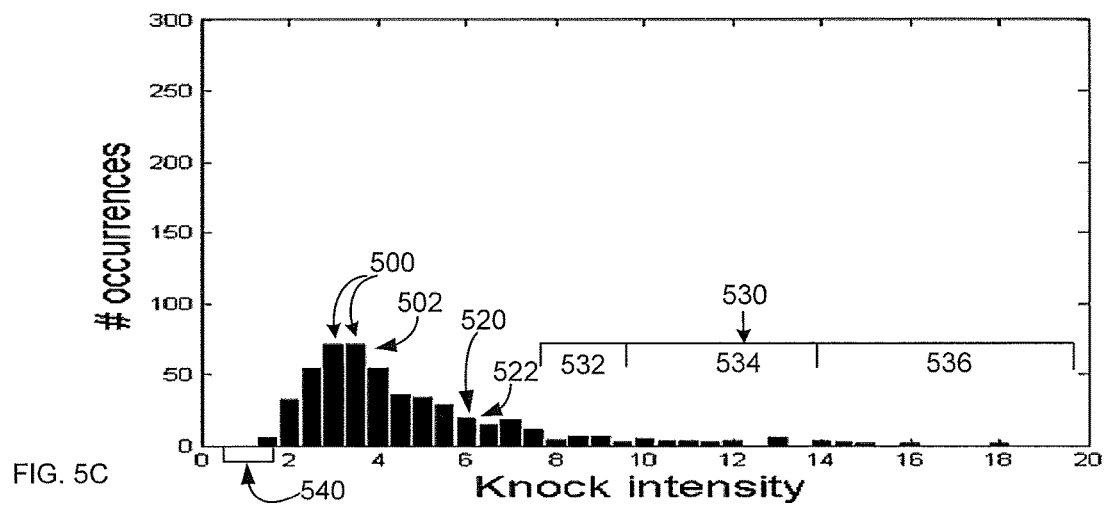

FIGS. 5A-C illustrate histograms for several tune states (over comparable windows of operation), according to some embodiments. FIG. 5A illustrates simulated knock intensities during a window of operation in which the engine is in an "undertuned" state. FIG. 5B illustrates simulated knock intensities during a window of operation in which the engine is in a "desired" tune state. FIG. 5C illustrates simulated knock intensities during a window of operation in which the engine is in an "overtuned" state. FIGS. 5A-C recast the data in FIG. 4 into histogram format, providing a graphically-convenient way to illustrate differences in the statistical variations among the knock intensity distributions and illustrate exemplary Descriptive Statistics. Actual graphing of data into histogram format is typically not be required.

A Descriptive Statistic (DS) may be used to represent a histogram and/or a statistical distribution of knock intensities in the window, and by extension, may identify the tune state of the engine. FIGS. 5A-C illustrate several exemplary descriptive statistics. DS500 is the knock intensity bin that has the maximum number of observed knocks (in the window). DS502 may be the number of knocks at DS500. DS510 may be the mean knock intensity (and/or the bin comprising the mean knock intensity). DS512 may be the number of knocks at the mean and/or the number of knocks in bins adjacent to the mean (e.g., an average of the bins on either side of the mean). DS520 may be the number of knocks at a multiple (e.g., 2×, 3×, 5×, 10×, 0.5×, 0.2×) of the knock intensity of DS500. In exemplary FIGS. 5A-C, DS520 is the number of knocks in a bin having at a knock intensity that is 5× (five times larger than) the knock intensity at which the maximum number of knocks occurs (DS500). For multiples greater than 1, DS520 may be a proxy for the standard deviation of the histogram.

A DS may comprise a range of knock intensities. DS 530 may be a number of knocks in a range of knock intensity bins (e.g., a window of highly intense knocks). DS530 may include a plurality of sub-ranges (e.g., DS 532, DS534, DS536). DS 540 may comprise a number of knocks in a range of knock intensities (or bins) having low intensities (e.g., well below the knock intensity at which the maximum number of knocks occurs).

By choosing an appropriate Descriptive Statistic (and/or combination thereof), a quick comparison between (e.g., observed and desired) statistical distributions may be made. A distribution of knock intensities may yield a DS whose deviation from an ideal DS is an indication that the tune state needs to be adjusted. In response to such a deviation, the Engine Control System may adjust one or more control parameters (e.g., ignition timing, injection timing, fuel volume, valve timing, valve position, and the like). Subsequently, the effect of this adjustment on the knock intensity distribution in a subsequent window may be evaluated (against the ideal) to ensure tuning was adjusted correctly. Such a system may provide "closed loop" control of the tune state, in which a dynamically calculated DS based on a moving window of operation is continuously compared against a desired DS. The ongoing results of this comparison may be used to maintain an optimal tune state of the engine.

A Descriptive Statistic may be a function of a plurality of knock intensities and/or a function of a plurality of knock intensity bins (e.g., a function of the difference between an observed and desired number of knocks at each of a plurality of different knock intensities). For example, consider a histogram of j=20 values of knock intensity, as measured over a window of 100 combustion cycles (k). A desired number of knocks at each intensity bin in the window may be a(j) (e.g., as represented in FIG. 5B). During a window of operation, an observed number of knocks at each intensity bin may be n(j) (e.g., as shown in FIG. 5A or FIG. 5C). An aggregate response (over a plurality of intensities and/or bins) may be used to identify the distribution of knock intensities. Exemplary responses may be defined by functions of the difference between observed and desired responses at each knock intensity may include (for all j), of which the examples below are not an exhaustive list:

$$\sum_{i=1}^{j}(a(i)-n(i))$$

$$\sum_{i=1}^{j}|a(i)-n(i)|$$

$$\sum_{i=1}^{j}(a(i)-n(i))^2$$

Various embodiments may include a loss function that is posed for the numerical minimization of a deviation between desired and actual values. Such functions may be determined over a range of knock intensities (e.g., over a subset of knock intensities). A function may incorporate weighting (e.g., to weight deviation between observed and desired according to a value of knock intensity of that deviation). FIG. 5B illustrates a representative weighting function 550 (e.g., a polynomial, in this case shown on log scale) that increases the weighting of low and high knock intensities (that are rarely observed), and decreases the weighting of knock intensities that are often observed often (e.g., near the mean knock intensity). Such a weighting function may bias the detection sensitivity toward ranges of knock intensities (e.g., very low and very high) that provide more useful discrimination information than commonly observed knock intensities.

A comparison between the histograms of FIGS. 5A-C and the raw data of FIG. 4 demonstrates the usefulness of using a statistical distribution to identify tune state. Differences between histograms may make these differences even more apparent.

Figure 6A:
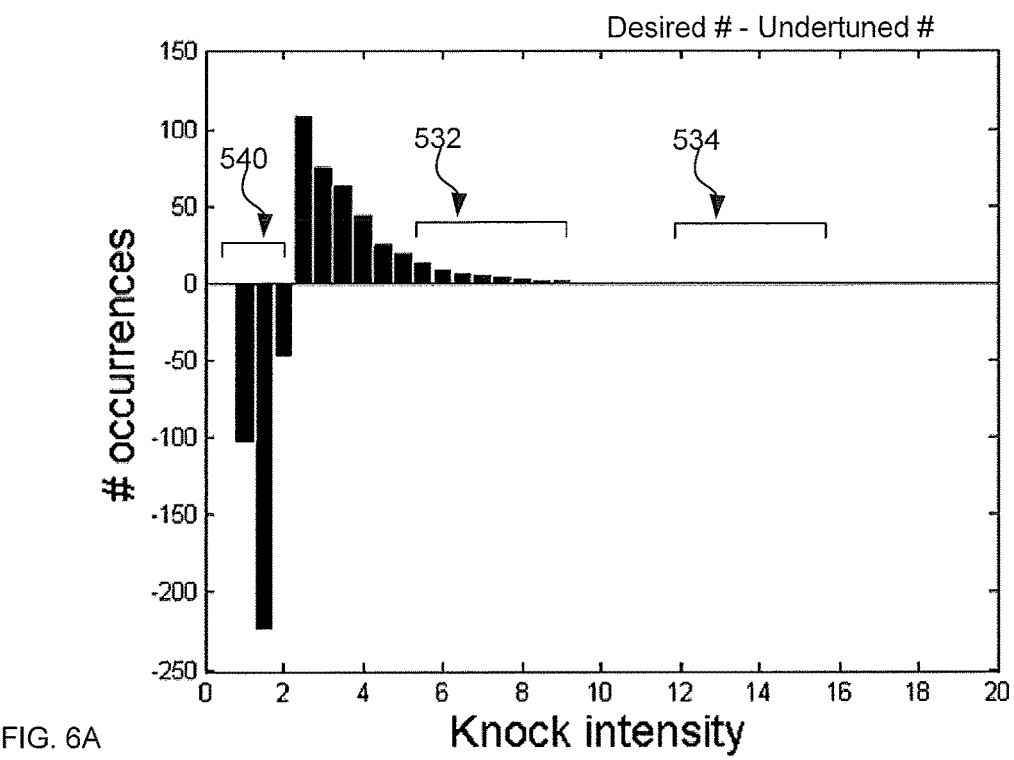
FIGS. 6A and 6B illustrate representative deviations in knock intensity distributions, according to some embodiments.
Figure 6B:
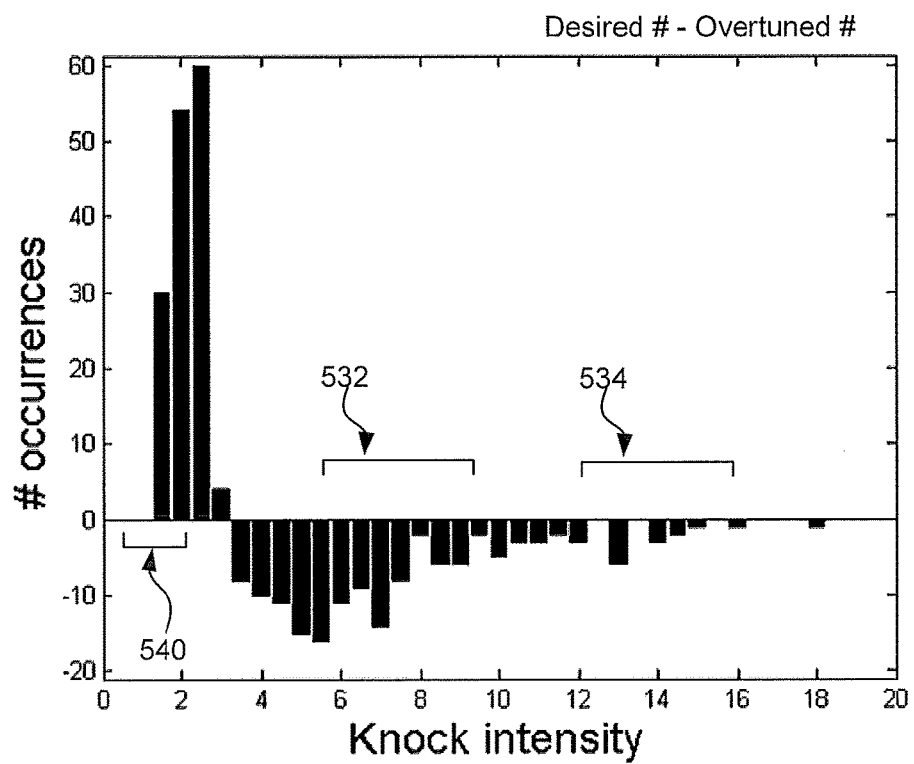

FIGS. 6A and 6B illustrate representative deviations in knock intensity distributions, according to some embodiments. FIG. 6A illustrates, for each knock intensity bin, the difference between the desired number of knocks (in that bin) and an observed number of knocks (in that bin). In FIG. 6A, the difference is between a desired state and an undertuned state (i.e., the difference between FIG. 5B and FIG. 5A). In this case exemplary DS540 (desired—observed over a range of low intensities) is negative. DS 532 (desired—observed over a range of medium intensities) is slightly positive, and DS 534 (desired—observed over a range of high intensities) is zero.

FIG. 6B illustrates the binwise difference between the desired number of knocks and an observed number of knocks during a window of "overtuned" operation (i.e., the difference between FIG. 5B and FIG. 5C). In this case, DS540 is positive, DS532 is negative, and DS 534 is negative.

As shown in FIG. 4, a single knocking event typically is a poor indicator of tune state (e.g., region 440). To the contrary, comparing FIGS. 6A and 6B, the magnitudes and values of DS 540, 532, and 534 are strikingly different for the "undertuned" and "overtuned" tune states. As such, these descriptive statistics may be used to adjust the tune state of the engine. By "distilling" the statistical distribution into a few (or even one) value (DS), computational speed may be improved, resulting in improved engine control.

By choosing an appropriate DS (or combination thereof) a deviation from a desired operating condition may be identified via a deviation in DS. The engine operating condition may then be adjusted (e.g., in a closed loop manner) to bring the engine to a desired state of tune (and so bring the DS back to a desired value). Tuning may be adjusted until deviation of the DS from an ideal DS is below a threshold (defining an acceptable limit to the deviation from the ideal DS). In some cases (e.g., a multicylinder engine) an aggregate threshold may be calculated. The aggregate threshold may describe an acceptable limit of the deviations of a plurality of DS (e.g., a combination of tests of a given DS against its respective threshold).

A combination of Descriptive Statistics may be chosen (optionally with weighting) that discriminates among states of tune. For example (using DSs from FIGS. 6A and 6B):

$$DS'=-0.5*DS540+DS532+10*DS534$$

DS' incorporates the sign difference (between DS 540 and DS 532). When DS' is positive, the engine may be undertuned, and a control parameter may be adjusted to increase the tune state (e.g., increase output). When DS' is negative, the engine may be overtuned, and a control parameter may be adjusted decrease the tune state (e.g., decrease output). A variety of different Descriptive Statistics may be used, according to different engine types, duty cycles, operating environments, fuel types, and the like. A threshold value for DS and/or DS' may be cylinder-dependent (e.g., a first cylinder has a first threshold of DS' that triggers adjustment, and a second cylinder has a second threshold of DS' that triggers adjustment. The first and second cylinders may have the same threshold.

Figure 7A:
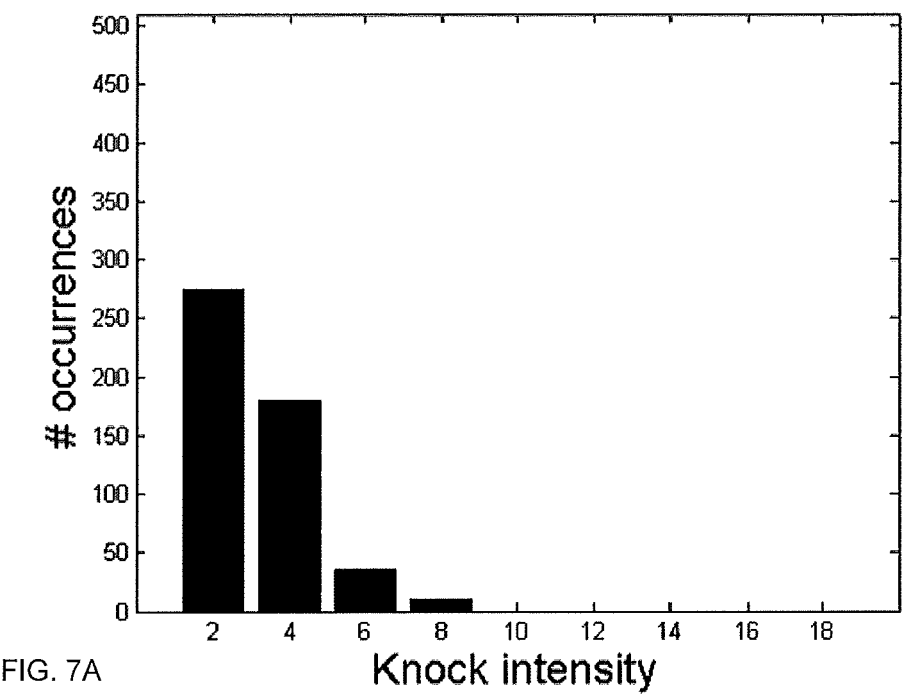
FIGS. 7A-B illustrate different binning protocols, according to some embodiments.
Figure 7B:
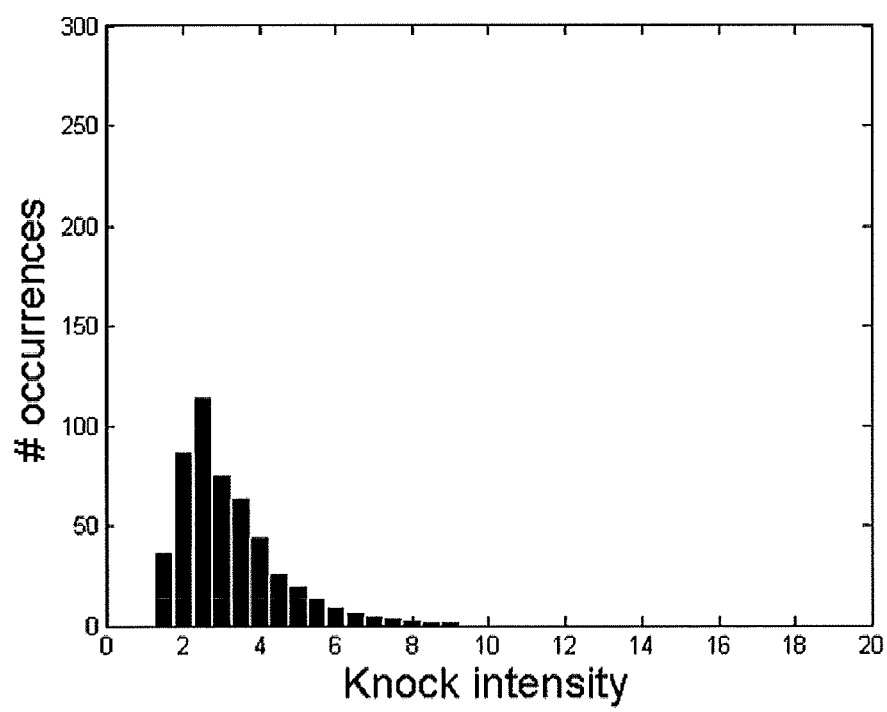

FIGS. 7A-B illustrate different binning protocols, according to some embodiments. A bin width of a histogram may describe the range of knock intensities that are grouped together (into the same "bin"). Some engines may be managed using a coarse binning as in FIG. 7A. Some engines may benefit from the use of fine binning as in 7B. Coarser binning may improve computational efficiency; fine binning may improve resolution of different responses (e.g., providing for more complicated DS calculations).

Figure 8:
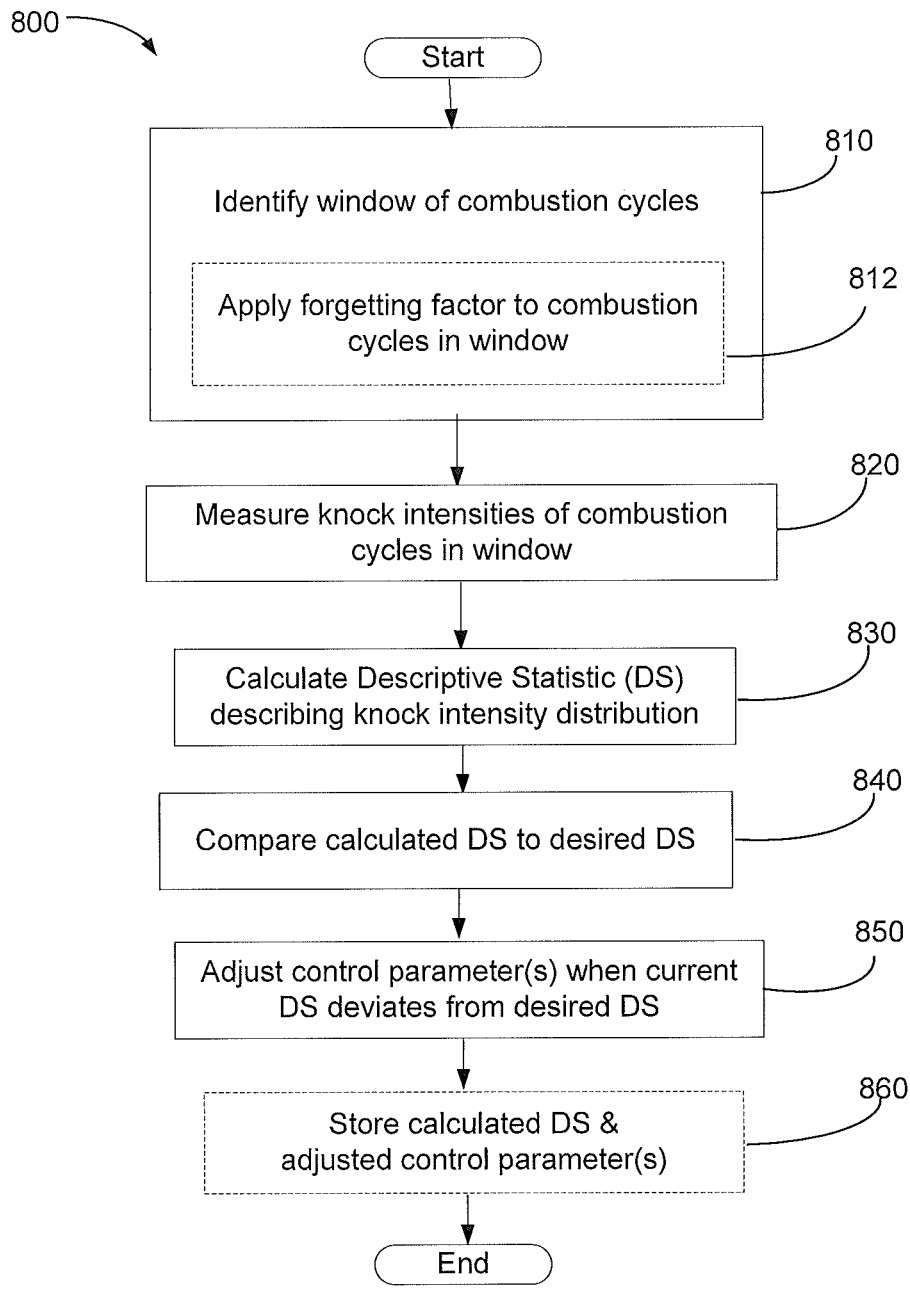
FIG. 8 illustrates a method for managing an engine, according to some embodiments.

FIG. 8 illustrates a method for managing an engine, according to some embodiments. Method 800 may be used to manage an engine (e.g., engine 101) by measuring a plurality of knock intensities gathered over a window of combustion cycles, and comparing the statistical distribution of these knock intensities to a desired or "ideal" distribution of knock intensities (e.g., at that operating condition).

In step 810, a window of combustion cycles is identified. A window of prior (e.g., previous 3, 5, 10, 20, 50, 100, 1000, 1E4, 1E5) combustion cycles may be used to evaluate operation of the engine. Window size may be chosen according to the period of time over which a deviation from desired operation is expected to occur. For example, at 600 rotations per minute (rpm) of a single-cylinder engine, a window of 600 combustion cycles represents the past 60 seconds of operation (of that cylinder). As such, a moving 60 second window might enable the engine control system to respond to changes within minutes (or even within a minute). A longer window (e.g., several minutes, or even hours) may "dampen" the response, allowing for short term deviations without changing control parameters. A shorter window (e.g., 1-10 seconds) may provide a faster response. Choosing a larger window may provide more data, which may improve statistical accuracy. Choosing a smaller window may provide for a more recent "snapshot" of engine operation, and so may provide for a faster response to deviation from expected operation. A window may be less than 1E5, including less than 1E4, including less than 1000, including less than 100 combustion cycles.

In a multicylinder engine, a window may comprise each combustion event from each cylinder, a subset of combustion events from each cylinder, each combustion event from one cylinder, a subset of combustion events from one cylinder, or other combinations of prior combustion events.

In some cases, a "forgetting factor" may be incorporated into the choice of the window. In such cases, a weighting may be applied to each combustion cycle, such that the most recent combustion cycles have the highest weights and the more distant (in the past) combustion cycles have less weight. A forgetting factor that applies an exponential decay to the weights of the combustion events in the window may provide for a rapid response (to recent cycles) yet still provide for the incorporation of a large number of (albeit low weighted) prior cycles. The window of combustion cycles may be determined prior to operation, and may be updated (e.g., increased, decreased) during operation. A forgetting factor is incorporated into the identification of the window in optional step 812.

A preferred way to compute the descriptive statistic may include updating the frequencies of occurrences of the knock intensities using a forgetting factor (e.g., as follows). Let $n_j(k)$ denote the estimated frequency of the j:th knock intensity and let there be J defined knock intensity levels, where J is a positive integer. Further, for a knock intensity l measured at cycle (k), let $$\delta_{j,l}(k) = \begin{cases} 1, & j = l \\ 0, & j \neq l \end{cases} \quad (0.1)$$

Then the frequencies (the average number of occurrences) can be computed as $$n_j(k) = \lambda n_j(k-1) + (1-\lambda)\delta_{j,l}(k) \quad (0.2)$$

where $\lambda$ is a forgetting factor, $0 \leq \lambda \leq 1$. The choice of $\lambda$ may be a design trade off and may depend on the application. The corresponding Descriptive Statistic Q(k) can be computed (for example) as:

$$Q(k) = \sum_{j=1}^{J} (n_j(k) - a_j)^2 w_j \quad (0.3)$$

where $w_j$ is a weighting factor.

In step 820, a plurality of knock intensities in the window is measured (e.g., calculated using data from sensor 130). The knock intensity for each combustion cycle in the window may be measured. A subset of knock intensities in the window may be measured.

In step 830, a descriptive statistic (DS) is calculated. The DS may represent the statistical distribution of measured knock intensities in the window (optionally incorporating the forgetting factor).

In step 840, the calculated DS may be compared to a desired DS. The desired DS may represent an expected statistical distribution of knock intensities (over a similar window) for an "ideally tuned" engine (i.e., operating in a desired state of tune). A deviation between the calculated DS (representing actual operation) and desired DS (representing "ideal" operation) may indicate that the engine is not operating in a desired state of tune.

In step 850, a control parameter is adjusted when the calculated DS deviates from the desired DS by an amount greater than a threshold. A threshold may include a magnitude of the difference (between observed and desired). A threshold may include a time (over which the observed DS deviates from the desired DS). In an exemplary embodiment, engine control system 150 adjusts a state of tune of engine 101 by changing a control parameter (e.g., ignition timing, fuel injection volume, fuel injection timing). Knock intensities in a subsequent window of operation (with the adjusted control parameters) may then be measured to ensure that the engine is operating in an improved state of tune, or (if calculated DS continues to deviate from desired DS) to further adjust one or more control parameters.

Data derived from differences in knock intensity distributions may facilitate engine management, particularly with respect to managing stochastic processes such as knocking. The distribution of knock intensities may be estimated or approximated using the DS, and a deviation between an observed DS and an expected DS may represent a deviation between an observed distribution of knock intensities and a desired distribution of knock intensities. These deviations in distributions may be used to adjust a control parameter of the engine, changing a tune state of the engine during subsequent operation.

A moving window of prior combustion cycles (optionally weighted using a forgetting factor), and the monitoring of the intensity distributions therein may provide for "real-time" control of the engine. A change that affects knocking (e.g., a different fuel source) may be manifest as a change in the distribution of knock intensities, which may be assessed using the DS. Deviation between actual and desired DS may trigger the adjustment of a control parameter, such that the engine accommodates the change. By using the statistical distributions of knock intensities, engine management may be more robust against the influence of stochastic processes on knock measurement. As such, an engine may be operated in an optimal tune state that combines high performance, good fuel economy, and low emissions, yet does not damage the engine. Embodiments disclosed herein may also be directed toward management of other processes having stochastic responses. This description is illustrative, and not restrictive.

What is claimed is:

1. A system for managing an engine using a statistical distribution of knock intensities from prior combustion cycles, the system comprising:
   an engine control unit configured to operate the engine;
   a sensor configured to sense knocking within a cylinder of the engine during a combustion cycle;
   computing hardware comprising a computer readable, non transitory storage medium coupled to a processor and a memory, the processor configured to communicate with the sensor and engine control unit, the system configured to:
   identify a window of at least three combustion cycles;
   measure a knock intensity for each of a plurality of combustion cycles within the window;
   calculate a descriptive statistic (DS) describing a distribution of the measured knock intensities;
   compare the calculated DS to a desired DS, the desired DS representing a desired distribution of knock intensities; and
   adjust a control parameter of the engine when the calculated DS deviates from the desired DS by an amount greater than a threshold.

2. The system of claim 1, wherein:
   the engine comprises at least a first cylinder and a second cylinder;

the sensor comprises a first sensor sensing the first cylinder and a second sensor sensing the second cylinder;

the window comprises a first set of knock intensities from the first sensor sensing the first cylinder and a second set of knock intensities from the second sensor sensing the second cylinder;

the calculated DS comprises a calculated first DS for the first cylinder using the first set of knock intensities and a calculated second DS for the second cylinder the second set of knock intensities;

the desired DS comprises a desired first DS representing a desired distribution of knock intensities for the first cylinder and a desired second DS representing a desired distribution of knock intensities for the second cylinder, the desired second DS having a different value than the desired first DS; and the control parameter comprises:
  a first control parameter that is adjusted when the calculated first DS deviates from the desired first DS by an amount greater than a first threshold; and
  a second control parameter that is adjusted when the calculated second DS deviates from the desired second DS by an amount greater than a second threshold.

3. The system of claim 1, wherein the engine comprises at least a first cylinder and a second cylinder, and the system is further configured to:
  calculate a calculated first DS for the first cylinder and a calculated second DS for the second cylinder;
  compare the calculated first DS to a desired first DS for the first cylinder;
  compare the calculated second DS to a desired second DS for the second cylinder;
  calculate an aggregate DS deviation comprising the deviations of the actual DS from the desired DS for the first and second cylinders; and
  adjust the control parameter when the aggregate DS exceeds an aggregate threshold.

4. The system of claim 2, wherein the calculated first DS for the first cylinder is calculated over a first window of combustion cycles, and the calculated second DS for the second cylinder is calculated over a second window of combustion cycles, the second window having a different number of combustion cycles than the first window.

5. The system of claim 1, wherein the system is further configured to:
  calculate a DS comprising a histogram of at least two knock intensity bins, each bin having:
    a lower limit defining a minimum knock intensity for a measured knock intensity to be included in the bin;
    an upper limit defining a maximum knock intensity for a measured knock intensity to be included in the bin;
    a representative knock intensity for the bin; and
    a measured number of knocks within the window for which the measured knock intensity is within the upper and lower limits of the bin; and
  compare the measured number of knocks in a bin to a desired number of knocks in that bin.

6. The system of claim 5, wherein the system is further configured to compare a binwise difference between the measured number of knocks and the desired number of knocks for a subset of the knock intensity bins within the histogram.

7. The system of claim 6, wherein the subset comprises the bins having a representative knock intensity that is among the lowest 5% of the representative knock intensities of the bins in the histogram.

8. The system of claim 6, wherein the window comprises at least 100 combustion cycles, and the subset comprises the bins having a representative knock intensity that is among the highest 40% of the representative knock intensities of the bins in the histogram.

9. The system of claim 6, wherein the subset comprises the bins having a representative knock intensity that is between 5% and 20% of the lowest representative knock intensities of the bins in the histogram.

10. The system of claim 5, wherein the system is further configured to compare the measured number of knocks to the desired number of knocks for a bin having a representative knock intensity that is least 20% larger than the representative knock intensity of a bin in the histogram that has a maximum number of knocks.

11. The system of claim 10, wherein the bin has a representative knock intensity that is at least 200% larger than the representative knock intensity of the bin that has the maximum number of knocks.

12. The system of claim 5, wherein the system is further configured to calculate the DS using a weighting function that weights the difference between the measured and desired number of knocks in a bin according to the representative knock intensity of the bin.

13. The system of claim 12, wherein the weighting function decreases the weighting of bins having representative knock intensities proximate to the representative knock intensity of the bin having a mean knock intensity.

14. The system of claim 5, wherein the system is further configured to compare the measured number of knocks to the desired number of knocks for a bin in the histogram that has the maximum number of knocks.

15. The system of claim 1, wherein the system is further configured to calculate the DS by applying a forgetting factor to the knock intensities, the forgetting factor deweighting the combustion cycles based on their temporal distance, in the past, from an endpoint in time of the window.

16. The system of claim 5, wherein the DS comprises the number of knock intensity bins within the window that have at least one knock.

17. A method for managing an engine using a statistical distribution of knock intensities from prior combustion cycles, the method comprising:
  identifying a window of at least three combustion cycles;
  measuring a knock intensity for each of a plurality of combustion cycles within the window;
  calculating a descriptive statistic (DS) describing a distribution of the measured knock intensities;
  comparing the calculated DS to a desired DS, the desired DS representing a desired distribution of knock intensities; and
  adjusting a control parameter of the engine when the calculated DS deviates from the desired DS by an amount greater than a threshold.

18. The method of claim 17, wherein:
  calculating the DS comprises calculating a histogram of between 2 and 100 knock intensity bins, each bin having:
    a lower limit defining a minimum knock intensity for a measured knock intensity to be included in the bin;
    an upper limit defining a maximum knock intensity for a measured knock intensity to be included in the bin;
    a representative knock intensity for the bin; and
    a measured number of knocks within the window for which the measured knock intensity is within the upper and lower limits of the bin; and comparing the calculated DS to the desired DS comprises comparing the measured number of knocks in a bin to a desired number of knocks in that bin.

19. The method of claim 18, wherein comparing the calculated DS to the desired DS comprises comparing a binwise difference between the measured number of knocks and the desired number of knocks for:
   a first subset of the knock intensity bins that have a representative knock intensity that is among the lowest 5% of the representative knock intensities of the bins in the histogram; and
   a second subset of the knock intensity bins that have a representative knock intensity that is among the highest 40% of the representative knock intensities of the bins in the histogram.

20. The method of claim 17, wherein the window comprises at least 100 combustion cycles, and calculating the DS comprises applying a forgetting factor to the knock intensities, the forgetting factor deweighting the combustion cycles based on their temporal distance, in the past, from an endpoint in time of the window.

\* \* \* \* \*